US012490892B2

(12) United States Patent
Levesque et al.

(10) Patent No.: US 12,490,892 B2
(45) Date of Patent: Dec. 9, 2025

(54) CLOSED-LOOP CONTROL OF ILLUMINATION IN AN ENDOSCOPIC CAMERA SYSTEM

(71) Applicant: INTUITIVE SURGICAL OPERATIONS, INC., Sunnyvale, CA (US)

(72) Inventors: Marc Levesque, Sunnyvale, CA (US); Jonathan D. Halderman, Sunnyvale, CA (US); Brian D. Hoffman, Mountain View, CA (US); Derek C. Liou, Cupertino, CA (US); Nariman Majdi Nasab, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 595 days.

(21) Appl. No.: 17/279,383

(22) PCT Filed: Sep. 27, 2019

(86) PCT No.: PCT/US2019/053404
§ 371 (c)(1),
(2) Date: Mar. 24, 2021

(87) PCT Pub. No.: WO2020/069284
PCT Pub. Date: Apr. 2, 2020

(65) Prior Publication Data
US 2021/0386279 A1 Dec. 16, 2021

Related U.S. Application Data

(60) Provisional application No. 62/737,263, filed on Sep. 27, 2018.

(51) Int. Cl.
*A61B 1/06* (2006.01)
*A61B 1/00* (2006.01)
(Continued)

(52) U.S. Cl.
CPC ........ *A61B 1/0669* (2013.01); *A61B 1/00057* (2013.01); *A61B 1/05* (2013.01); *A61B 1/0646* (2013.01); *A61B 1/07* (2013.01)

(58) Field of Classification Search
CPC ..... A61B 1/0669; A61B 1/00057; A61B 1/05; A61B 1/0646; A61B 1/07; A61B 1/0655;
(Continued)

(56) References Cited

U.S. PATENT DOCUMENTS 9,622,326 B1 * 4/2017 Devyver .............. G09G 3/3406
2010/0228089 A1 9/2010 Hoffman et al.
(Continued)

FOREIGN PATENT DOCUMENTS

CN 102215736 A 10/2011
CN 103505174 A 1/2014
(Continued)

OTHER PUBLICATIONS

Office Action for Chinese Application No. CN20198075599, mailed Sep. 20, 2022, 22 pages.
(Continued)

*Primary Examiner* — Michael J Carey
*Assistant Examiner* — Christen A. Sharpless
(74) *Attorney, Agent, or Firm* — Haynes & Boone, LLP.

(57) ABSTRACT

An illumination source may be coupled to an image capture device through a connector. A light sensor is placed downstream of the connector to measure the light received by the image capture device from the illumination source. The light sensor provides the measurement of the received light to the illumination source for closed-loop control of illumination source. The light sensor may be positioned in a camera housing to take into account light attenuation from the illumination source to the camera. The light sensor may be positioned at other locations on the image capture device.

(Continued)

Multiple light sensors may be positioned at different locations on the image capture device to detect sources or locations of attenuation. Redundant light sensors of more than one type of sensor may be used at a single light sensor location to provide for validation of measurements and increase the variety of information measured.

20 Claims, 12 Drawing Sheets

(51) Int. Cl.
*A61B 1/05* (2006.01)
*A61B 1/07* (2006.01)

(58) Field of Classification Search
CPC ..... A61B 1/045; A61B 1/0638; A61B 1/0684; G02B 23/2469; G02B 23/2484; H04N 23/555; H04N 23/74; H05B 45/10; H05B 47/12; H05B 47/11
See application file for complete search history.

(56) References Cited

U.S. PATENT DOCUMENTS

| | | | | |
|---|---|---|---|---|
| 2010/0324366 | A1* | 12/2010 | Shimotsu | A61B 1/045 600/109 |
| 2011/0245616 | A1* | 10/2011 | Kobayashi | A61B 1/0655 600/178 |
| 2013/0345517 | A1* | 12/2013 | Morimoto | A61B 1/0661 600/178 |
| 2014/0085420 | A1 | 3/2014 | Shahinian et al. | |
| 2016/0206210 | A1* | 7/2016 | Toriyama | A61B 1/00006 |
| 2016/0306163 | A1* | 10/2016 | Sakai | H05B 45/22 |
| 2017/0112370 | A1 | 4/2017 | Daidoji et al. | |

FOREIGN PATENT DOCUMENTS

| | | |
|---|---|---|
| JP | 2007042383 A | 2/2007 |
| JP | 2013090878 A | 5/2013 |
| WO | WO-2013049347 A1 | 4/2013 |
| WO | WO-2016006371 A1 | 1/2016 |
| WO | WO-2016035363 A1 | 3/2016 |
| WO | WO-2020041717 A1 | 2/2020 |

OTHER PUBLICATIONS

International Search Report and Written Opinion for Application No. PCT/US2019/053404, mailed on Dec. 2, 2019, 12 pages.
Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
International Preliminary Report on Patentability for Application No. PCT/US2019/053404, mailed on Apr. 8, 2021, 7 pages.
Office Action for Chinese Application No. CN20198075599, mailed Sep. 27, 2023, 18 pages.
Office Action for Japanese Application No. JP20210516866, mailed Jun. 27, 2023, 07 pages.

* cited by examiner

CLOSED-LOOP CONTROL OF ILLUMINATION IN AN ENDOSCOPIC CAMERA SYSTEM

CROSS REFERENCE TO RELATED APPLICATIONS

This application is a national stage application filed under 35 U.S.C. § 371 of PCT/US2019/053404 filed Sep. 27, 2019, which claims the benefit of U.S. Provisional Patent Application Ser. No. 62/737,263 filed Sep. 27, 2018, the disclosures of which are expressly incorporated herein by reference.

BACKGROUND

Image capture devices are typically factory calibrated before use in the field. During the calibration process, one or more images of test patterns are captured and used as a reference to generate calibration data for an image capture device. For example, one or more transforms are used to adjust a captured image from the image capture device to align with a known image of a test pattern. The calibration process may calibrate the captured image to correct for color, optical, alignment, or other image sensor-induced or optical-induced errors or variations in the image capture device. The calibration process generates a set of calibration data that is stored with the image capture device and applied to correct images captured by the image capture device in use.

An illumination source external to the image capture device may supply light for illuminating a scene captured by the image capture device. The illumination source may be separately calibrated from the image capture device to provide a controlled amount of light.

SUMMARY

A first aspect of the disclosure includes a system that comprises a controller system that comprises an illumination source and a connection port configured to supply light from the illumination source external to the controller system. The system also comprises an image capture device comprising a light guide with a connector configured to connect to the connection port and receive light supplied by the illumination source, wherein the image capture device is configured to illuminate a scene with the received light. The system also comprises a light sensor configured to measure a power and/or a wavelength of the received light. The controller system is configured to adjust operation based on the measured power of the received light.

In some implementations of the first aspect of the disclosure, the power is an overall power of the received light or a power at one or more wavelengths of the received light.

In some implementations of the first aspect of the disclosure, the light sensor is a spectrometer.

In some implementations of the first aspect of the disclosure, the light sensor is positioned within a housing of the image capture device, at the connector, or at a connector between the light guide and the image capture device.

In some implementations of the first aspect of the disclosure, the light sensor is one of a plurality of light sensors positioned within a housing of the image capture device, at the connector, and/or at a connector between the light guide and the image capture device. The controller system is configured to determine a location of an illumination error based on a difference between a first measured power of the received light at a first position and a second measured power of the received light at a second position. The second position is farther from the connector than the first position.

In some implementations of the first aspect of the disclosure, the controller system is configured to adjust operation to change an output of the illumination source based on the measured power and/or wavelength of the received light.

In some implementations of the first aspect of the disclosure, the controller system is configured to adjust operation to change a calibration parameter for processing images received by the image capture device based on the measured power of the received light.

In some implementations of the first aspect of the disclosure, the light sensor is clamped to the light guide to measure a portion of the received light scattered or refracted out of the light guide.

In some implementations of the first aspect of the disclosure, the light guide is a single optical fiber, a fiber optic bundle with a plurality of optical fibers, and/or a liquid-filled lumen.

In some implementations of the first aspect of the disclosure, the light guide is used with a rigid optical element.

In some implementations of the first aspect of the disclosure, the light guide is the fiber optic bundle, wherein a subset of optical fibers from the fiber optic bundle is bifurcated from the fiber optic bundle and directed to provide a portion of the received light to the light sensor.

In some implementations of the first aspect of the disclosure, the light sensor is positioned to measure the received light scattered at a connection between the light guide and a second light guide.

In some implementations of the first aspect of the disclosure, the system further comprises a filter positioned between the light guide and the light sensor configured to supply one or more channels of the received light to the light sensor. In some implementations of the first aspect of the disclosure, the filter comprises a dichroic filter. In some implementations of the first aspect of the disclosure, the filter comprises a trichroic prism or other multi-channel spectral separation optical component or assembly.

In some implementations of the first aspect of the disclosure, the image capture device is an endoscope.

A second aspect of the disclosure includes an image capture device that comprises a light guide with a connector configured to connect to a connection port of an illumination source and receive light supplied by the illumination source. The image capture device also comprises an image sensor configured to capture an image of a scene illuminated with the received light. The image capture device also comprises a light sensor configured to measure a power and/or wavelength of the received light, wherein the connector is further configured to communicate the measured power and/or wavelength of the received light.

In some implementations of the second aspect of the disclosure, the power is an overall power of the received light or a power at one or more wavelengths of the received light.

In some implementations of the second aspect of the disclosure, the light sensor is a spectrometer.

In some implementations of the second aspect of the disclosure, the light sensor is positioned within a housing of the image capture device, at the connector, or at a connector between the light guide and the image capture device.

In some implementations of the second aspect of the disclosure, the light sensor is one of a plurality of light sensors positioned with a housing of the image capture device, at the connector, and/or at a connector between the light guide and the image capture device.

In some implementations of the second aspect of the disclosure, the light sensor is clamped to the light guide to measure a portion of the received light scattered or refracted out of the light guide.

In some implementations of the second aspect of the disclosure, the light guide is a single optical fiber, a fiber optic bundle with a plurality of optical fibers, and/or a liquid-filled lumen.

In some implementations of the second aspect of the disclosure, the light guide is used with a rigid optical element.

In some implementations of the second aspect of the disclosure, the light guide is the fiber optic bundle, wherein a subset of optical fibers from the fiber optic bundle is bifurcated from the fiber optic bundle and directed to provide a portion of the received light to the light sensor.

In some implementations of the second aspect of the disclosure, the light sensor is positioned to measure the received light scattered at a connection between the light guide and a second light guide.

In some implementations of the second aspect of the disclosure, the system further comprises, a filter positioned between the light guide and the light sensor configured to supply one or more channels of the received light to the light sensor.

In some implementations of the second aspect of the disclosure, the filter comprises a dichroic filter.

In some implementations of the second aspect of the disclosure, the filter comprises a trichroic prism or other multi-channel spectral separation optical component or assembly.

In some implementations of the second aspect of the disclosure, the image capture device is an endoscope.

A third aspect of the disclosure includes a controller system that comprises an illumination source configured to supply light. The controller system also comprises a light sensor configured to measure a power of the supplied light. The controller system also comprises a connection port configured to communicate the supplied light external to an external device. The connection port is further configured to receive a communication from the external device of a measured power and/or wavelength of light received by the external device. The controller system also comprises a controller configured to adjust operation based on the measured power and/or wavelength of the supplied light and the measured power of light received by the external device.

In some implementations of the third aspect of the disclosure, the connection port is further configured to receive a communication from the external device of a plurality of measurements of power and/or wavelength of light received at different locations along an optical transmission path of the external device. The controller is configured to determine a location of an illumination error based on a difference between a first of the plurality of measurements of power and/or wavelength of light received at a first position along the optical transmission path and a second of the plurality of measurements of power and/or wavelength of light received at a second position along the optical transmission path. The second position is farther from the connector than the first position.

In some implementations of the third aspect of the disclosure, the controller system is configured to adjust operation to change an output of the illumination source based on the measured power and/or wavelength of the light received by the external device.

In some implementations of the third aspect of the disclosure, the external device is an image capture device.

In some implementations of the third aspect of the disclosure, the controller system is configured to adjust operation to change a calibration parameter for processing images received from the image capture device based on the measured power and/or wavelength of the light received by the image capture device.

In some implementations of the third aspect of the disclosure, the image capture device is an endoscope.

A fourth aspect of the disclosure includes a method of closed-loop control of an illumination source coupled to an external device. The method comprises supplying light from the illumination source to a connection port and measuring a power and/or wavelength of the supplied light at the illumination source. The method also comprises receiving light at a connector of the external device coupled to the connection port and measuring a power and/or wavelength of the received light by a light sensor coupled to the external device. The method also comprises communicating the measured power and/or wavelength of the received light from the external device to the illumination source and adjusting an output of light supplied at the illumination source based on the measured power and/or wavelength of the supplied light and the measured power and/or wavelength of the received light.

In some implementations of the fourth aspect of the disclosure, the external device is an image capture device.

In some implementations of the fourth aspect of the disclosure, the method further comprises adjusting a calibration parameter for processing images received by the image capture device based on the measured power and/or wavelength of the supplied light and the measured power and/or wavelength of the received light.

In some implementations of the fourth aspect of the disclosure, the image capture device is an endoscope.

In some implementations of the fourth aspect of the disclosure, the light sensor is clamped to a light guide of the external device.

In some implementations of the fourth aspect of the disclosure, the light guide a single optical fiber, a fiber optic bundle with a plurality of optical fibers, and/or a liquid-filled lumen.

In some implementations of the fourth aspect of the disclosure, the light guide is used with a rigid optical element.

In some implementations of the fourth aspect of the disclosure, the light guide is the fiber optic bundle, wherein a subset of optical fibers from a fiber optic bundle is bifurcated from the fiber optic bundle and directed to provide a portion of the received light to the light sensor.

In some implementations of the fourth aspect of the disclosure, the light sensor is positioned to measure the received light scattered at a connection between a first light guide and a second light guide in the external device.

In some implementations of the fourth aspect of the disclosure, the method further comprises filtering the received light to supply one or more channels of the receive light to the light sensor.

In some implementations of the fourth aspect of the disclosure, filtering the received light comprises directing the received light through a dichroic filter.

In some implementations of the fourth aspect of the disclosure, filtering the received light comprises directing the received light through a trichroic prism or other multi-channel spectral separation optical component or assembly.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
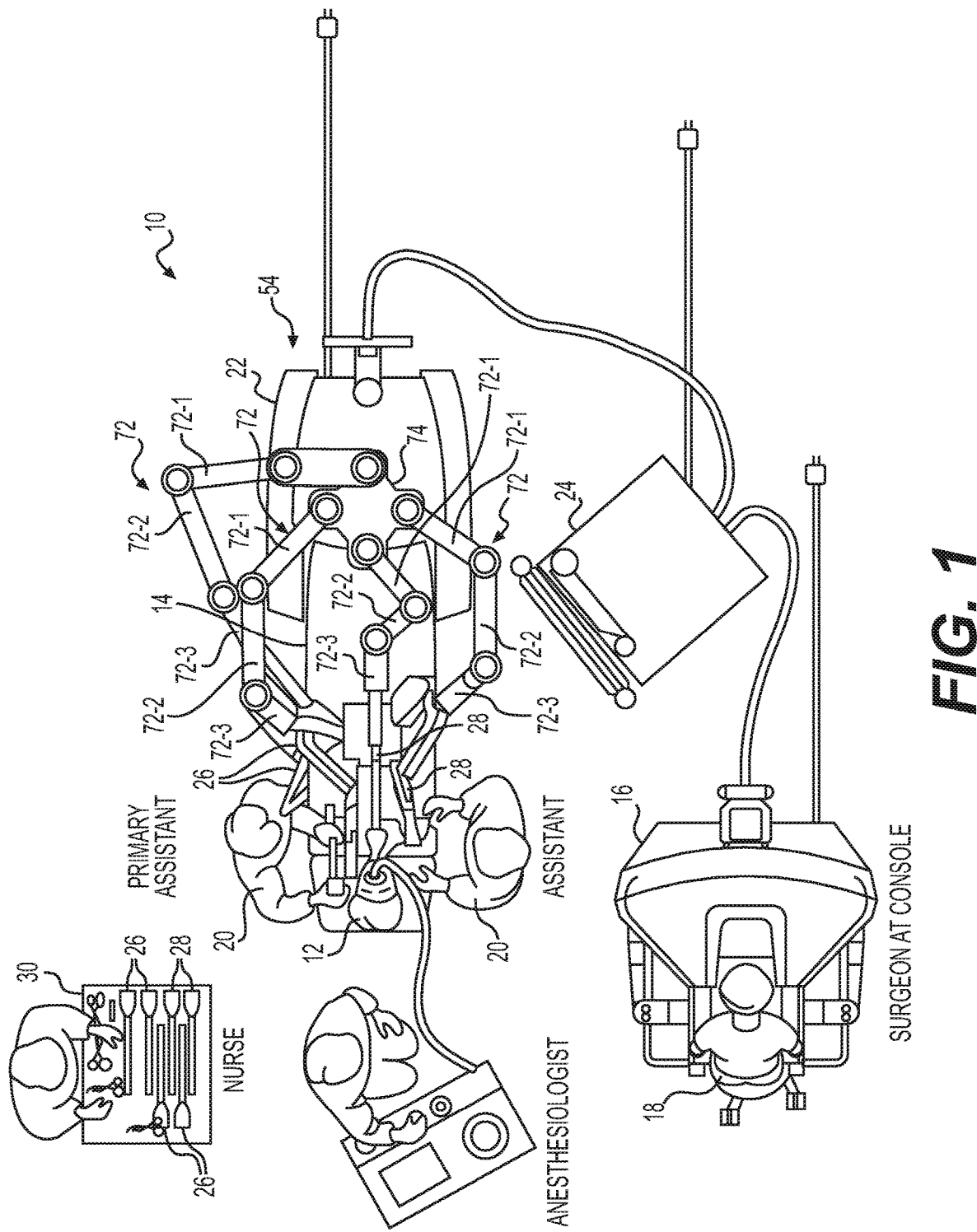
FIG. 1 is a plan view of a minimally invasive teleoperated surgical system.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

Elements described in detail with reference to one embodiment, implementation, or application may, whenever practical, be included in other embodiments, implementations, or applications in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

Aspects of the invention are described primarily in terms of an implementation using a da Vinci® Surgical System (specifically, a Model IS4000, marketed as the da Vinci® Xi™ HD™ Surgical System), commercialized by Intuitive Surgical, Inc. of Sunnyvale, Calif. Knowledgeable persons will understand, however, that inventive aspects disclosed herein may be embodied and implemented in various ways, including robotic and, if applicable, non-robotic embodiments and implementations. Implementations on da Vinci® Surgical Systems (e.g., the Model IS4000 da Vinci® Xi™ Surgical System, the Model IS3000 da Vinci Si® Surgical System) are merely exemplary and are not to be considered as limiting the scope of the inventive aspects disclosed herein.

In accordance with various aspects, the present disclosure describes a system and method for closed-loop control of an illumination source coupled to an image capture device through a connector. The image capture device uses one or more optical components or systems to illuminate a scene being imaged by the image capture device with light received from the illumination source. Typically, the image capture device is separately calibrated from the illumination source leading to variability in the overall illumination system that is not addressed by the separate calibration of each of the devices. Additionally, the image capture device may be used with different illumination sources leading to further variability. A primary source of the variability occurs at the connection between the illumination source and the image capture device.

To resolve this variability and provide closed-loop control of the illumination source, a light sensor is placed downstream of the connector in the image capture device. The light sensor is configured to measure light received at the image capture device. Preferably, the light sensor is positioned in a camera housing of the image capture device to measure light received by the camera for closed-loop control of the illumination source that takes into account light attenuation from the illumination source to the camera. The light sensor may be positioned at other locations on the image capture device. Multiple light sensors may be positioned at different locations on the image capture device to detect sources or locations of attenuation. Redundant light sensors of more than one type of sensor may be used at a single light sensor location to provide for validation of measurements and increase the variety of information measured, such as to measure both the overall power of the received light as well as the spectral distribution of the received light.

In an example, an endoscopic image capture device includes a camera housing that comprises a flexible cable with a light guide, such as a fiber optic bundle. The cable comprises a connector configured to couple the light guide to a light source. The camera housing also comprises a light sensor and a rigid camera shaft with a camera tip on a distal end. The camera tip includes one or more image sensors and associated optics systems. The camera shaft also comprises a second light guide, such as a second fiber optic bundle, configured to convey light received from the light guide in the flexible cable to the camera tip to illuminate a scene being imaged by the one or more image sensors, such as a diagnostic or surgical procedure. The light sensor may be positioned in the camera housing proximate to the light guide, the second light guide, or a junction between the light guide and the second light guide. Additional light sensors may also be provided at the connector, at a connection between the light guide and the camera housing, and/or at the camera tip. The light sensor(s) are configured to measure a power and/or wavelength of the light received from the light source.

Images captured by the one or more image sensors in the camera tip are conveyed via a wired or wireless electrical connection to the camera housing and in turn conveyed via a wired or wireless electrical connection in the flexible cable to the connector. Additionally, a measurement from the light sensor of the received light is conveyed via a wired or wireless electrical connection in the flexible cable to the connector. Operation of the light source is adjusted based on the measurement from the light sensor to provide closed-loop control of the light source to adjust for sources of light attenuation from the light source to the camera.

A controller system comprises a socket configured to accept the connector. The controller system comprises a light source coupled to the socket and configured to supply light to the light guide in the flexible cable. The controller system also comprises an image processor coupled to socket and configured to receive the images conveyed via the electrical connection in the flexible cable. The image processor is configured to processes the received images based on calibration data for the image capture device to generate one or more processed images. The controller system is also configured to receive the measurement from the light sensor on the image capture device. As the endoscopic image capture device is used, the optical transmission properties of the light guide in the flexible cable may change over time. Additionally, the camera tip may wear over time due to use in medical procedures. Therefore, at least the optical properties of the endoscopic image capture device will change over time, resulting in attenuation of the light received from the light source. Additionally, the endoscopic image capture device may be coupled to different controller systems at different times, where one or more of the controller systems may have a different configuration that attenuates the light received from the light source in different ways.

The controller system adjusts for this attenuation of the light received from the light source by adjusting an output of the light source to compensate for the attenuation or by adjusting calibration data for the image capture device to compensate for the attenuation. For example, a power level of the light source may be increased based on the measurement received from the light sensor. Likewise, a calibration value for brightness, luminance, contrast, or other image processing variable may be adjusted in the calibration data for the image capture device based on the measurement received from the light sensor.

While an endoscopic image capture device is used in the example above, any image capture device may be used that is coupled to an external illumination source for providing closed-loop control of the illumination source, such as a borescope or other such inspection camera. Likewise, any other device coupled to the controller system that operates based on the light received from the controller system and includes a light sensor for measuring the received light is contemplated by this disclosure.

Referring now to the drawings, in which like reference numerals represent like parts throughout the several views, FIG. 1 is a plan view of a minimally invasive teleoperated surgical system 10, typically used for performing a minimally invasive diagnostic or surgical procedure on a patient 12 who is lying on a mobile operating table 14. The system includes a user control system 16, such as a mobile surgeon's console for use by a surgeon 18 during the procedure. One or more assistants 20 may also participate in the procedure. The minimally invasive teleoperated surgical system 10 further includes a manipulating system 22, such as a mobile patient-side cart, and a mobile electronics cart 24. In some embodiments, the table 14, user control system 16, manipulating system 22, and the electronics cart 24 are wheel mounted to provide mobility.

The manipulating system 22 or other such manipulating system includes multiple segmented mechanical support arms 72, each having one end portion rotatably mounted to a vertical support structure 74 and having another end mounting a removably coupled surgical instrument 26. In some of embodiments, each mechanical support arm 72 includes a first segment 72-1, a second segment 72-2 and a third segment 72-3. During setup for a procedure, the multiple segments of at least one support arm 72 are moved to position a surgical instrument for insertion within a minimally invasive incision in the body of the patient 12.

During the procedure, while instruments are inserted within a patient's body cavity, the surgeon 18 views the surgical site through the user control system 16. An image of the surgical site can be obtained by an endoscope 28, such as a stereoscopic endoscope, which can be manipulated by the manipulating system 22 to orient the endoscope 28. Computer processor(s) located on the electronics cart 24 can be used to process the images of the surgical site for subsequent display to the surgeon 18 through the user control system 16. The computer processor(s) may alternatively be referred to herein as an image processor or video processor.

One or more illumination sources or illuminators may also be provided on the electronics cart 24 to provide light for use by the endoscope 28 for illuminating the surgical site. The illuminators may include a white light source, a colored light source (e.g., red, green, blue, cyan, magenta, yellow, etc.), an infrared light source, a laser light source, or any other type of light source or combination thereof. Different illuminators may be used at different points in time in a surgical or diagnostic procedure. For example, the electronics cart 24 may be controlled, such as through a selection on the user control system 16, to provide light from a first set of one or more of the illuminators at a first time and provide light from a second set of one or more of the illuminators at a second time.

The number of surgical instruments 26 used at one time will generally depend on the diagnostic or surgical procedure and the space constraints within the operating room among other factors. If it is necessary to change one or more of the surgical instruments 26 being used during a procedure, an assistant 20 can remove the surgical instrument 26 from the manipulating system 22, and replace it with another surgical instrument 26 from a tray 30 in the operating room.

Figure 2:
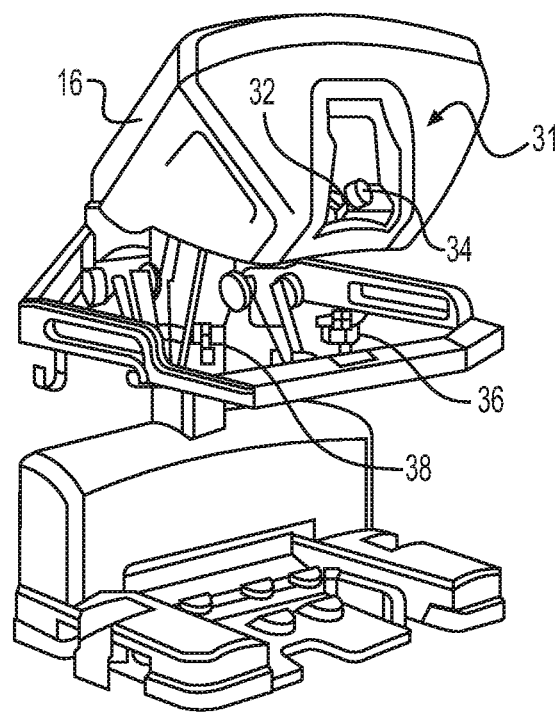
FIG. 2 is a perspective view of a user control system.

FIG. 2 is a perspective view of the user control system 16. The user control system 16 includes a display area 31 with a left eye display 32 and a right eye display 34 for presenting the surgeon 18 with a coordinated stereoscopic view of the surgical site that enables depth perception.

The console 16 further includes one or more control inputs 36. One or more surgical instruments installed for use on the manipulating system 22 (shown in FIG. 1) move in response to surgeon 18's manipulation of the one or more control inputs 36. The control inputs 36 can provide the same mechanical degrees of freedom as their associated surgical instruments 26 (shown in FIG. 1) to provide the surgeon 18 with telepresence, or the perception that the control inputs 36 are integral with the instruments 26 so that the surgeon has a strong sense of directly controlling the instruments 26. To this end, position, force, and tactile feedback sensors (not shown) may be employed to transmit position, force, and tactile sensations from the surgical instruments 26 back to the surgeon's hands through the control inputs 36. A height of the control inputs 36 may be adjusted with a height adjustment lever 38.

The user control system 16 is usually located in the same room as the patient so that the surgeon can directly monitor the procedure, be physically present if necessary, and speak to a patient-side assistant directly rather than over the telephone or other communication medium. But, the surgeon can be located in a different room, a completely different building, or other remote location from the patient allowing for remote surgical procedures.

Figure 3:
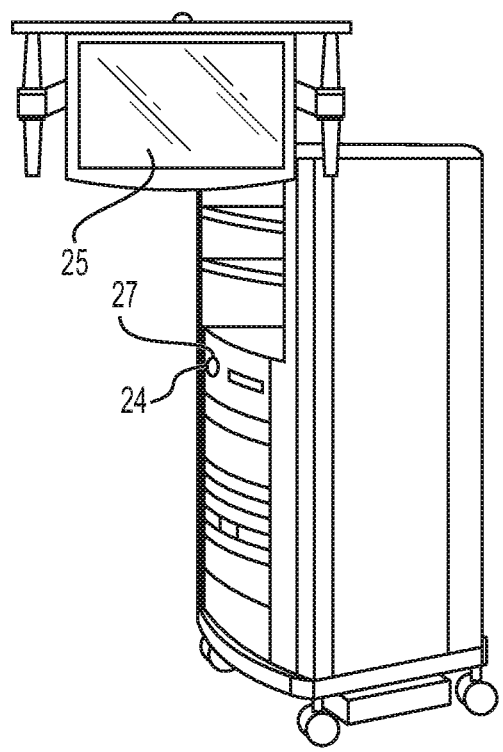
FIG. 3 is a perspective view of an electronics cart.

FIG. 3 is a perspective view of the electronics cart 24. The electronics cart 24 can be coupled with the endoscope 28 via a socket 27 and includes a computer processor to process captured images for subsequent display, such as to a surgeon on the user control system 16, or on another suitable display located locally and/or remotely. For example, if a stereoscopic endoscope is used, a computer processor on electronics cart 24 can process the captured images to present the surgeon with coordinated stereo images of the surgical site. Such coordination can include alignment between the opposing images and can include adjusting the stereo working distance of the stereoscopic endoscope. As another example, image processing can use camera calibration parameters to compensate for imaging errors of the image capture device, such as optical aberrations. The electronics cart also includes one or more illumination sources optically coupled to the socket 27 for supplying light to the endoscope 28.

Optionally, equipment in electronics cart 24 may be integrated into the user control system 16 or the manipulating system 22, or it may be distributed in various other locations in the operating room. More generally, the electronics cart 24 or user control system 16 with the integrated equipment from the electronics cart 24 may be referred to herein as a controller system for providing a light source to the endoscope 28 and processing images from the image capture device.

Figure 4:
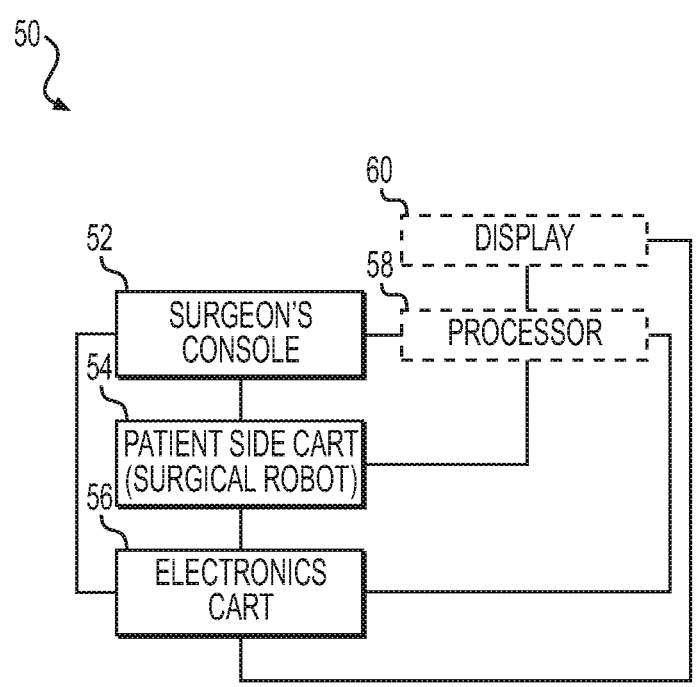
FIG. 4 is a diagrammatic illustration of a teleoperated surgical system.

FIG. 4 diagrammatically illustrates a teleoperated surgical system 50 (such as the minimally invasive teleoperated surgical system 10 of FIG. 1). A user control system 52 (such as user control system 16 in FIG. 1) can be used by a surgeon to control a manipulating system 54 (such as manipulating system 22 in FIG. 1) during a minimally invasive procedure. The manipulating system 54 can use an image capture device, such as a stereoscopic endoscope, to capture images of a surgical site and output the captured images to a computer processor located on an electronics cart 56 (such as the electronics cart 24 in FIG. 1). As with the electronics cart 24, the electronics cart 56 also includes one or more illumination sources for supplying light to the image capture device. The image capture device also includes one or more light sensors for measuring light received by the image capture device from the one or more illumination sources. The computer processor typically includes one or more data processing boards purposed for executing computer readable code stored in a non-volatile memory device of the computer processor.

In one aspect, the computer processor can process the captured images in a variety of ways prior to any subsequent display. For example, the computer processor can use camera calibration parameters to compensate for imaging errors of the image capture device prior to displaying the processed images to the surgeon via the user control system 52. For example, one or more of the calibration parameters may be adjusted to compensate for attenuation of the light received by the image capture device from the one or more illumination sources as measured by the one or more light sensors. Additionally or in the alternative, the computer processor may adjust the output of the one or more illumination sources to compensate for attenuation of the light received by the image capture device from the one or more illumination sources as measured by the one or more light sensors.

Additionally or in the alternative, the captured images can undergo image processing by a computer processor located outside of electronics cart 56. In one aspect, teleoperated surgical system 50 includes an optional computer processor 58 (as indicated by dashed line) similar to the computer processor located on electronics cart 56, and manipulating system 54 outputs the captured images to computer processor 58 for image processing prior to display on the user control system 52. In another aspect, captured images first undergo image processing by the computer processor on electronics cart 56 and then undergo additional image processing by computer processor 58 prior to display on the user control system 52. In some implementations, the electronics cart 56 and/or computer processor 58 are collectively referred to as a controller system.

Teleoperated surgical system 50 can include an optional display 60, as indicated by dashed line. Display 60 is coupled with the computer processor located on the electronics cart 56 and with computer processor 58, and captured images processed by these computer processors can be displayed on display 60 in addition to being displayed on a display of the user control system 52. In various implementations, the display 60 may be located on the electronics cart 56, such as with a display 25 on the electronics cart 24. In some implementations, the display 60 may be separate from the user control system 52 and the electronics cart 58.

Figure 5:
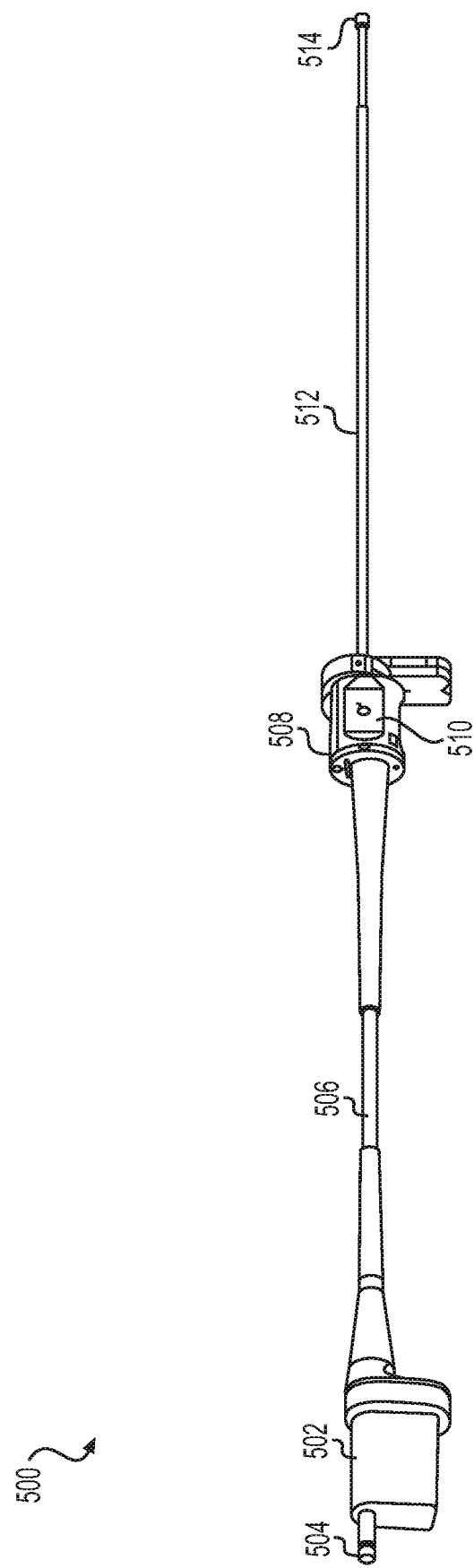
FIG. 5 is a perspective view of an endoscopic image capture device.

FIG. 5 is a perspective view of an endoscopic image capture device 500. The endoscopic image capture device 500 includes a connector 502, a flexible cable 506, a camera housing 508, a rigid camera shaft 512, and a camera tip 514. The connector 502 comprises an optical port 504 and an electrical port (not shown). The connector 502 is sized and shaped to be inserted into a socket on the electronics cart 56, such as in a socket 27 or other mating receptacle of the electronics cart 24. The optical port 504 is configured to receive light supplied by the electronics cart 24 to the socket 27.

The flexible cable 506 is coupled between the connector 502 and the camera housing 508. The flexible cable 506 includes a light guide configured to convey light received from the optical port 504 of the connector 502 to the camera housing 508. For example, the light guide may be a single optical fiber, a fiber optic bundle with a plurality of optical fibers, and/or a liquid-filled lumen. Additionally, the light guide may be used with rigid optical elements such as rods, lenses, or the like. The flexible cable 506 also includes an electrical connection configured to provide electrical communication between the electrical port of the connector 502 and the camera housing 508. The electrical connection may be a wired or wireless connection. In some implementations, the wired connection is a wire, ladder line, twisted wire pair, universal serial bus (USB) cable, Ethernet cable, or other wired communication line.

The camera housing 508 receives the distal end of the light guide from the flexible cable 506. The camera housing 508 also receives a proximal end of the rigid camera shaft 512. A distal end of the rigid camera shaft 512 includes the camera tip 514 with one or more image sensors and associated optics systems. For example, the camera tip 514 may include two image sensors with respective optical components for capturing stereoscopic images of a scene, such as a surgical or diagnostic procedure. The rigid camera shaft 512 may also include a second light guide configured to convey light received at the camera housing 508 from the light guide in the flexible cable to the camera tip 514 to illuminate a scene being imaged by the one or more image sensors. The second light guide may be a single optical fiber, a fiber optic bundle with a plurality of optical fibers, and/or a liquid-filled lumen. Additionally, the second light guide may be used with rigid optical elements such as rods, lenses, or the like. In some implementations, the second light guide may be composed exclusively of rigid optical elements within the rigid camera shaft 512.

The rigid camera shaft 512 may also include a second electrical connection configured to provide electrical communication between the one or more image sensors of the camera tip 514 and the camera housing 508. Images captured by the one or more image sensors in the camera tip 514 are conveyed via the electrical connection in the rigid camera shaft 512 to the camera housing 508. The electrical connection may be a wired or wireless connection. In some implementations, the wired connection is a wire, ladder line, twisted wire pair, universal serial bus (USB) cable, Ethernet cable, or other wired communication line.

The camera housing 508 may also comprise one or more camera control units (not shown) configured to supply power and provide control signals for capturing images from the one or more image sensors in the camera tip 514. For example, when the camera tip 514 comprises two image sensors for capturing stereoscopic images, the camera housing 508 may have a respective camera control unit for controlling each of the two image sensors. The one or more camera control units are also configured to communicate the captured images to the electrical port of the connector 502 for processing by the electronics cart 56 and/or computer processor 58.

The camera housing 508 may also comprise a display 510 for displaying one or more operational controls of the endoscopic image capture device 500. The camera housing 508 may also comprises a read-only memory (not shown) that stores a unique identifier and/or calibration data of the endoscopic image capture device 500. In some implementations, the unique identifier is a universally unique identifier (UUID) for a medical device. The unique identifier may be used to obtain calibration data for the endoscopic image capture device 500 as described in commonly owned U.S. App. No. 62/722,314, entitled "Off-Camera Calibration Parameters for an Image Capture Device," hereby incorporated by reference in its entirety.

Figure 6:
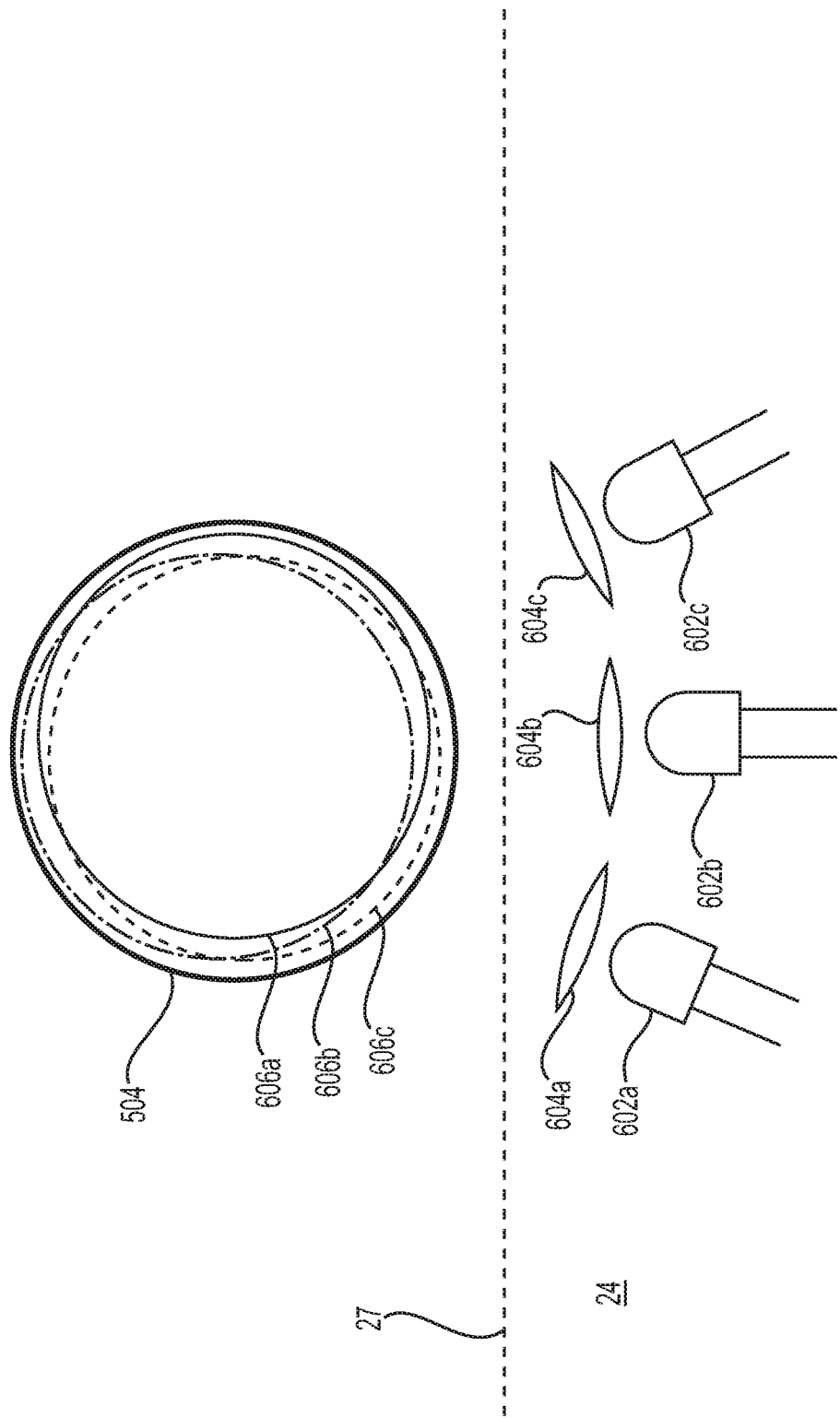
FIG. 6 is a diagram of the optical coupling between the electronics cart and the optical port of the endoscopic image capture device.

FIG. 6 is a diagram of the optical coupling between the socket 27 of the electronics cart 24 and the optical port 504 of the endoscopic image capture device. As shown in FIG. 6 an air-to-guide coupling (e.g., air-to-fiber) is depicted, though other optical couplings may be used. The electronics cart 24 may include a light source 602a, a light source 602b, and a light source 602c, collectively light sources 602. While three light sources 602 are shown, more or fewer light sources 602 may be included in the electronics cart 24. Each of the light sources 602 may provide a different spectrum of light or otherwise provide a different channel for the combined light provided by the electronics cart 24. For example, the light source 602a may provide a red light, light source 602b may provide a blue light, and light source 602c may provide a green light. Additional light sources outside of the visible spectrum of light may also be provided, such as an infrared or ultraviolet light source. The light sources 602 may be provided by light emitting diodes (LEDs), lasers, light bulbs, or any other light source. Additionally, one or more filters (not shown) may be used in conjunction with one or more of the light sources 602 to provide light of a desired spectral characteristic (e.g., color, polarization, etc.).

The electronics cart 24 may also include a lens 604a, a lens 604b, and a lens 604c, collectively lenses 604. There is a one-to-one correspondence between the lenses 604 and the light sources 602. Each of the lenses 604 is configured to shape and focus the light emitted by the corresponding light sources 602 onto the optical port 504. For example, the lens 604a is configured to shape and focus the light emitted by the light source 602a onto the optical port 504. However, variations in manufacturing and mechanical tolerances may result in differences between the angle of focus and size of the focal point from each of the light sources 602 on the optical port 504. For example, a projection 606a shown by the solid line within the optical port 504 represents the light focused onto the optical port 504 by the light source 602a and lens 604a. A projection 606b shown by the dash-dot line within the optical port 504 represents the light focused onto the optical port 504 by the light source 602b and lens 604b. A projection 606c shown by the dashed line within the optical port 504 represents the light focused onto the optical port 504 by the light source 602c and lens 604c. The degree of misalignment between each of the projections 606 is shown merely for illustrative purposes and greater or lesser degrees of misalignment may be present in use and is referred to more generally as a coupling loss between the light sources 602 and the optical port 504.

The coupling loss is not addressed or compensated for in the calibration of the endoscopic image capture device 500 or in the calibration of the light sources 602 in the electronics cart 24. Moreover, the coupling loss may vary among different electronics carts 24. Accordingly, the coupling loss represents a primary source of attenuation of the light produced by the light sources 602 before it is able to be used to illuminate a scene captured by the image sensor(s) in the endoscopic image capture device 500.

Additional sources of attenuation of the light produced by the light sources 602 include deterioration of the light guide in the flexible cable 506 from physical stressing or manipulation of the light guide. The physical deterioration of the light guide varies over time for a given endoscopic image capture device 500 and is different for a different endoscopic image capture device 500. Additionally, solarization of the light guide in the flexible cable 506 caused by the intensity of the light provided by the light sources 602 acts as an additional source of attenuation of the light produced by the light sources 602. Solarization of the light guide varies over time for a given endoscopic image capture device 500 and is different for a different endoscopic image capture device 500. Other sources of attenuation of the light produced by the light sources 602 before it is able to be used to illuminate a scene captured by the image sensor(s) in the endoscopic image capture device 500 may additionally be present. One or more sources of the attenuation may have a different impact on different channels of the received light.

Figure 7:
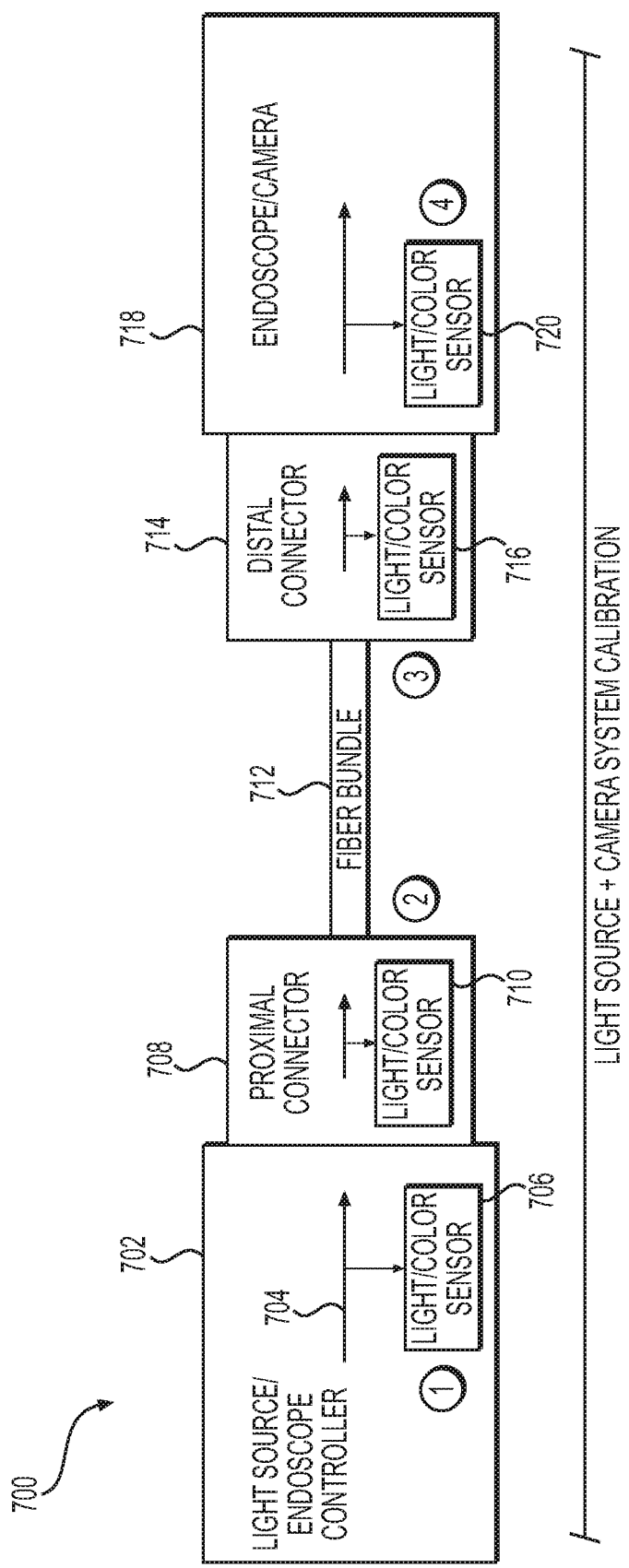
FIG. 7 is a block diagram of a system for closed-loop illumination control.

FIG. 7 is a block diagram of a closed-loop illumination control system 700. The system 700 includes a controller system 702 with a light source 704 and a light sensor 706. For example, the controller system 702 may be the electronics cart 24 or electronics cart 56. The light sensor 706 is positioned at a first location within the controller system 702 and is configured to generate a measurement of the light produced by the light source 704 and serves as a basis for comparison for measurement of the attenuation of the light produced by the light source 704. The controller system 702 stores a measurement from the light sensor 706 at a sampling interval.

The controller system 702 is optically coupled to a first connector 708 to supply the light produced by the light source 704. For example, the first connector 708 may be the connector 502. A light sensor 710 is positioned at a second location within the first connector 708 and is configured to measure the light received from the light source 704. At the second location, the light sensor 710 provides a measure of the received light that can be used to determine the coupling loss experienced at the optical connection between the controller system 702 and the connector 708. The light sensor 710 is configured to communicate the measurement of the received light at the second location to the controller system 702 at the sampling interval. The controller system 702 is in turn configured to determine the coupling loss based on a difference between the measurement of the light produced by the light source 704 and the measurement of the light received at the second location.

A light guide 712 conveys the light received at the second location to a connector 714 at a camera 718. For example, the light guide 712 may be a single optical fiber, a fiber optic bundle with a plurality of optical fibers, and/or a liquid-filled lumen. Additionally, the light guide may be used with rigid optical elements such as rods, lenses, or the like. While the connector 714 is depicted external to the camera 718, the connector 714 may be located internal to a housing of the camera 718. For example, the connector 714 may be the connection between the light guide in the flexible cable 506 and the second light guide in the rigid camera shaft 512, described above. In some implementations, the second connector 714 may be omitted. A light sensor 716 is positioned at a third location within the second connector 714 and is configured to measure the light received from the light guide 712. The light sensor 716 is configured to communicate the measurement of the received light at the third location to the controller system 702 at the sampling interval.

The controller system 702 is in turn configured to determine a combined attenuation due to the coupling loss and loss in the light guide 712 (e.g., due to physical manipulation or solarization) based on a difference between the measurement of the light produced by the light source 704 and the measurement of the light received at the third location. Additionally, the controller system 702 is configured to determine the attenuation across the light guide 712 based on a difference between the measurement of the light received at the third location and the measurement of the light received at the second location.

A light sensor 720 is positioned at a fourth location within the housing of the camera 718 and is configured to measure the light received by the camera 718. For example, the light sensor 720 may be within the housing of the camera 718 proximate to the light guide in the flexible cable 506, the second light guide in the rigid camera shaft 512, or at a junction therebetween. The light sensor 720 is configured to communicate the measurement of the received light at the fourth location to the controller system 702 at the sampling interval.

The controller system 702 is configured to determine a total attenuation based on a difference between the measurement of the light produced by the light source 704 and the measurement of the light received by the camera 718 at the fourth location. The controller system 702 is also configured to determine a coupling loss at the second connector 714 based on a difference between the measurement of the light received by the camera 718 at the fourth location and the measurement of the light received by the camera 718 at the third location. The controller system 702 is also configured to determine a transmission attenuation based on a difference between the measurement of the light received by the camera 718 at the fourth location and the measurement of the light received by the camera 718 at the second location.

Using the multiple light sensors 710, 716, 720 the controller system 702 is able to determine a location or source of attenuation of the light produced by the light source 704. In various implementations, one or more of the light sensors 710, 716, 720 may be omitted. For example, in one implementation only the light sensor 710 is used to determine the coupling loss with the controller system 702, which represents a primary source of the attenuation. In another implementation, only the light sensor 720 is used to determine the total attenuation. In some implementations, additional light sensors may also be used, such as at the camera tip 514 to measure the light used to illuminate a scene captured by the image sensor(s).

While only a single light sensor is shown at each of the second, third, and fourth locations, multiple different types of light sensors may be present at one or more of the locations. For example, a first light sensor may measure a total power of the received light and a second light sensor may measure spectral characteristics of the received light (e.g., spectral power distribution, wavelengths of light present in the received light, polarization of the received light, etc.). The controller system 702 is configured to validate the measurements of the multiple light sensors at a given location against each other. For example, a value of a total power measured by a first light sensor may be validated against a sum of the spectral power distribution measured by a second light sensor to validate that both light sensors are in agreement. If one of the light sensors at a given location is not in agreement with one or more of the other light sensors at that location, then the controller system 702 may identify the light sensor out of agreement as faulty or otherwise determine or alert a maintenance condition. By using different types of light sensors at a given location, additional spectral information of the received light may be obtained (e.g., color balance of the received light) in addition to validation of the measurements at a given location.

The light sensors 710, 716, 720 may be any type of sensor configured to measure a power and/or a wavelength of light received at the light sensor. For example, each of the light sensors 710, 716, 720 may be a simple photodiode, a spectrometer, photometer, a color sensor chip, and the like, or combinations thereof or used in conjunction with one or more optical components (e.g., prisms, filters, lenses, dichroic filter, trichroic prism or other multi-channel spectral separation optical component or assembly).

In various implementations, the sampling interval may be at a frequency of the framerate of the camera 718 or at a frequency lower than the framerate of the camera 718. For example, the sampling interval may be at or around 16 ms. In some implementations, the sampling interval for one or more of the light sensors 710, 716, 720 may be different. For example, the sampling interval for the light sensor 720 may be greater than or less than the sampling interval for the light sensor 710.

Figure 8:
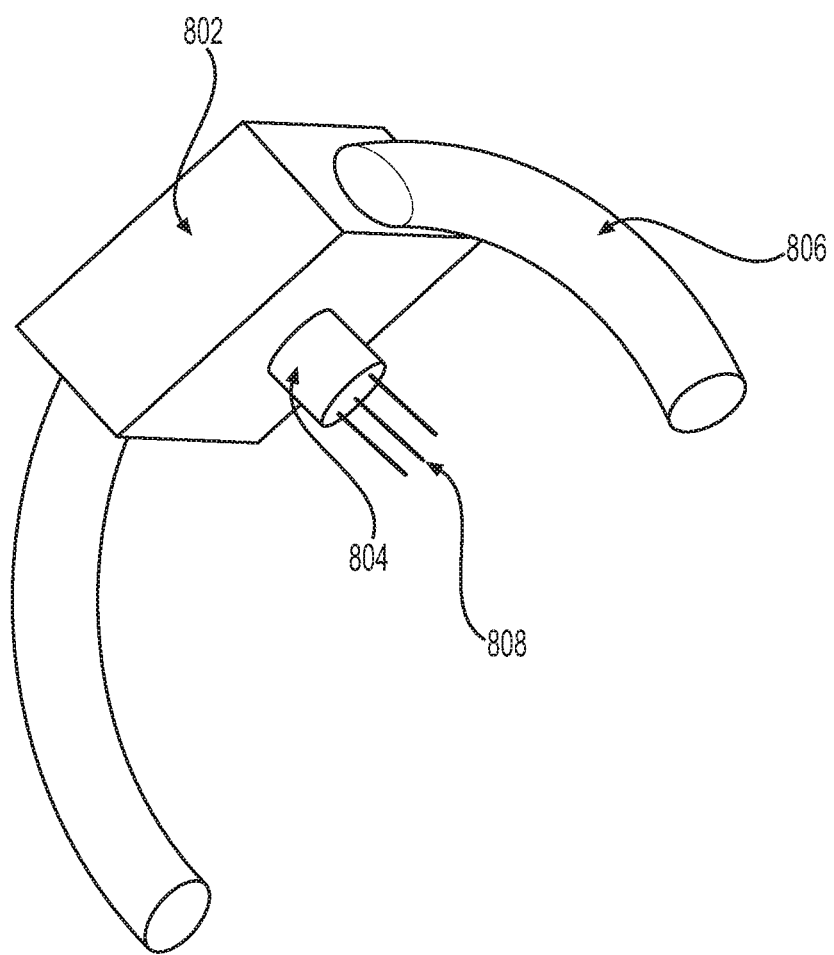
FIG. 8 is a block diagram of a light sensor clamped to a light guide.

FIGS. 8-12B depict various arrangements of the light sensors 710, 716, 720. FIG. 8 is a block diagram of a light sensor clamped to a light guide, such as the light guide 712. A bundle clamp 802 is configured to hold a light sensor 804 in place relative to a light guide 806. A protective covering (not shown) on the light guide 806 proximate to the location of the light sensor 804 may be removed to allow for light scattered or refracted out of the light guide 806 to reach the light sensor 804. The light sensor 804 comprises one or more electrical contacts 808 that are configured to communicate a measurement of the light received at the light sensor 804, such as to the controller system 702. For example, the measurement may be a voltage or current level that correspond to a voltage and/or wavelength of the light received at the light sensor 804. Alternatively or additionally, the measurement may be a value of a power level and/or a wavelength(s) of light received at the light sensor 804.

Figure 9:
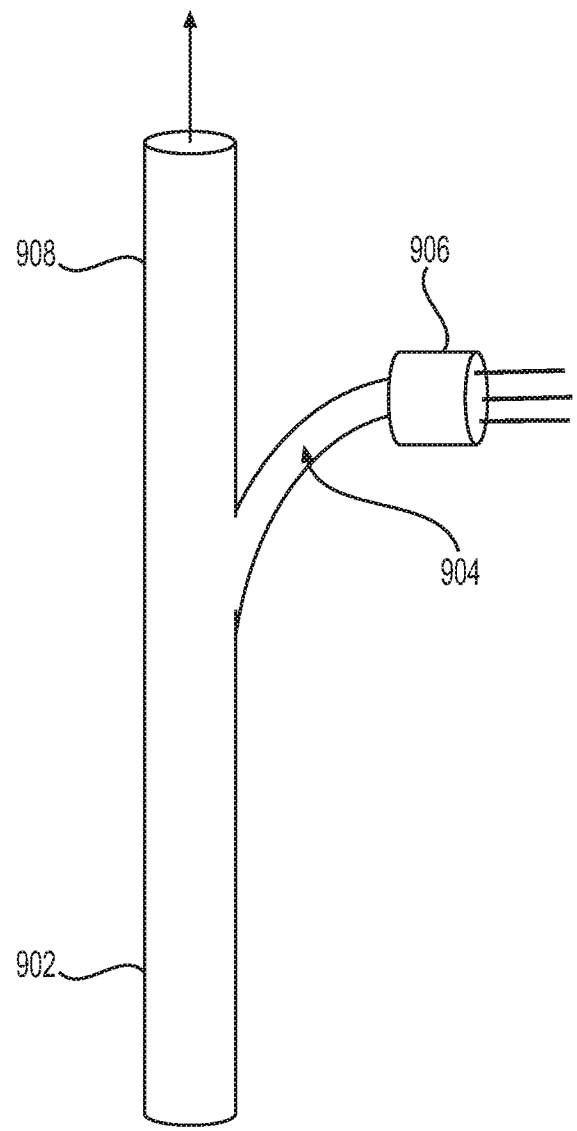
FIG. 9 is a block diagram of a light sensor coupled to a bifurcated portion of a fiber optic bundle.

FIG. 9 is a block diagram of a light sensor coupled to a bifurcated portion of a fiber optic bundle light guide. In the implementation shown in FIG. 9, the light guide 712 is a fiber optic bundle, where a main bundle 902 of the fiber optic bundle is bifurcated to provide a portion of the fibers 904 to be directed at the light sensor 906. For example, the main bundle 902 may have 3000 or more fibers, whereas the bifurcated portion of the fibers 904 may include 100 or less fibers. The light sensor 906 may be similar to the light sensor 804 described above. A remainder of the main bundle 908 continues transmission of light past the light sensor 906 to the camera 718. Other configurations and components may be used.

Figure 10:
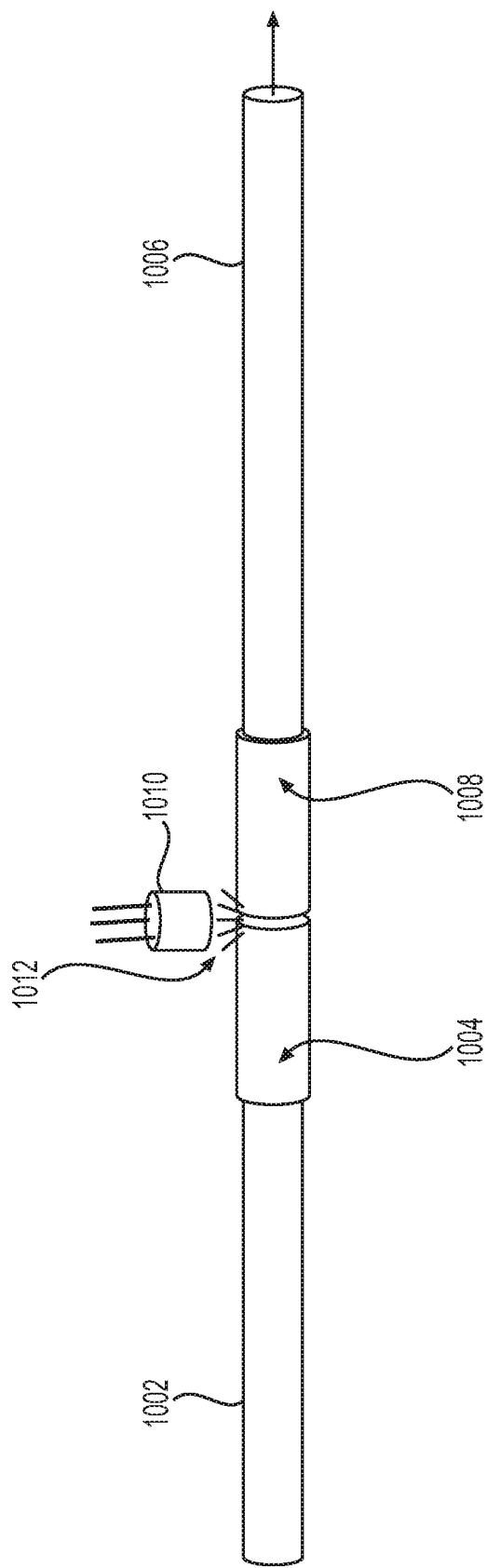
FIG. 10 is a block diagram of a light sensor at a junction of two light guides.

FIG. 10 is a block diagram of a light sensor at a connection of two light guides, such as the light guide 712 and a light guide (not shown) within the camera 718. A proximal bundle 1002 is connected to a distal bundle 1006 at the connection to transmit light from the proximal bundle 1002 to the distal bundle 1006. The proximal bundle 1002 comprises a ferrule 1004 and the distal bundle 1002 likewise comprises a ferrule 1008 at the connection. A light sensor 1010 is positioned at the junction to measure scattered light 1012 from the connection. The light sensor 1010 may be positioned within or an integral part of a ferrule connector housing or clamp (not shown). The light sensor 1010 may be similar to the light sensor 804 described above. Other configurations and components may be used.

Figure 11:
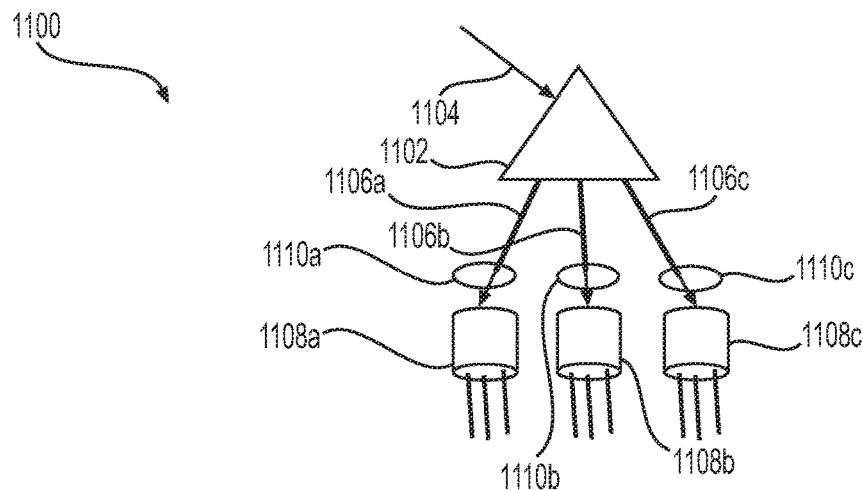
FIG. 11 is a functional block diagram of a light sensor assembly for measuring separate channels of received light.

FIG. 11 is a functional block diagram of a light sensor assembly 1100 for measuring separate channels of received light at a light sensor location. The light sensor assembly 1100 comprises a beam splitter 1102 configured to split the received light 1104 into a plurality of different beams 1106a, 1106b, 1106b. Each of the different beams 1106a, 1106b, 1106b is directed to a separate one of a plurality of light sensors 1108a, 1108b, 1108c, each configured to measure a separate channel of the received light 1104. For example, the beam splitter 1102 may be a prism or a trichroic prism or other multi-channel spectral separation optical component or assembly. Optionally, one or more optical elements 1110a, 1110b, 1110c may shape, focus, and/or filter the light provided to the respective light sensors 1108a, 1108b, 1108c. For example, the optical elements 1110a, 1110b, 1110c may additionally filter the received light for only supplying light of a desired channel to the respective light sensors 1108a, 1108b, 1108c. For example, optical elements 1110a, 1110b, 1110c may each be a dichroic filter for supplying a different color of light to the light sensors 1108a, 1108b, 1108c. Other variations in the configuration of optical elements and light sensors for measuring separate channels of the received light 1104 are contemplated by this disclosure.

Figure 12A:
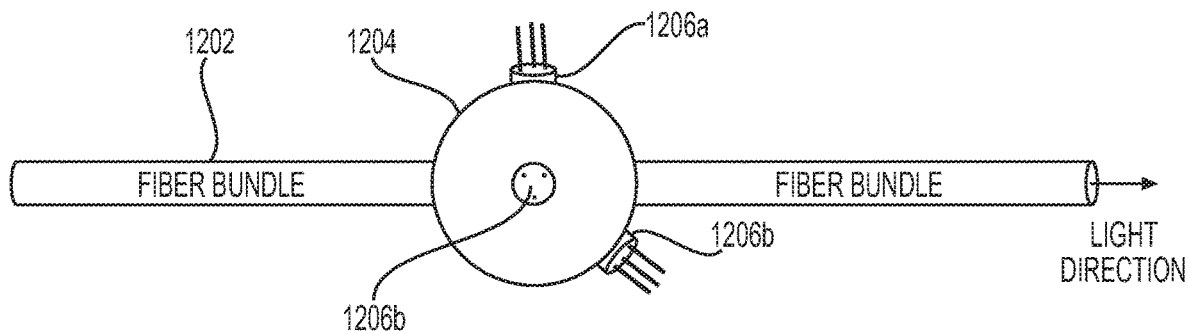
FIG. 12A is a block diagram of a light sensor in an integrating sphere located around a light guide.
Figure 12B:
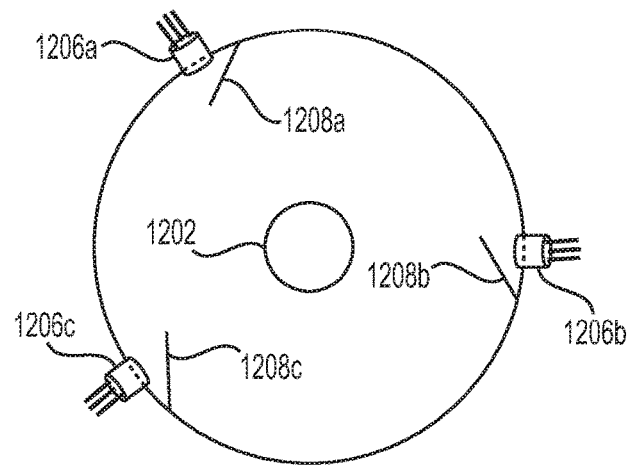
FIG. 12B is a cross-sectional view of the integrating sphere.

FIG. 12A is a block diagram of a light sensor in an integrating sphere located around a light guide, such as the light guide 712. A light guide 1202 has an integrating sphere 1204 located around the light guide 1202. Within the integrating sphere 1204 a protective covering of the light guide 1202 may be removed to allow for light scattered or refracted out of the light guide 1202 to be directed to one or more light sensors 1206a, 1206b, 1206c located about the integrating sphere 1204. An interior surface of the integrating sphere 1204 may have a diffuse coating for providing a uniform amount of light throughout the interior volume of the integrating sphere 1204. FIG. 12B is a cross-sectional view of the integrating sphere 1204. Optionally, one or more baffles 1208a, 1208b, 1208c may be located proximate to each of the light sensors 1206a, 1206b, 1206c. While the light sensors 1206a, 1206b, 1206c are show as being located axially about the light guide 1202 on the integrating sphere 1204, the light sensors 1206a, 1206b, 1206c may also be spaced longitudinally along the light guide 1202 on the integrating sphere. More of fewer light sensors 1206a, 1206b, 1206c than those shown may be used. Additionally, one or more filters (not shown) may be positioned about each of the light sensors 1206a, 1206b, 1206c. The light sensors 1206a, 1206b, 1206c may be similar to the light sensor 804 described above. Other configurations and components may be used.

Figure 13:
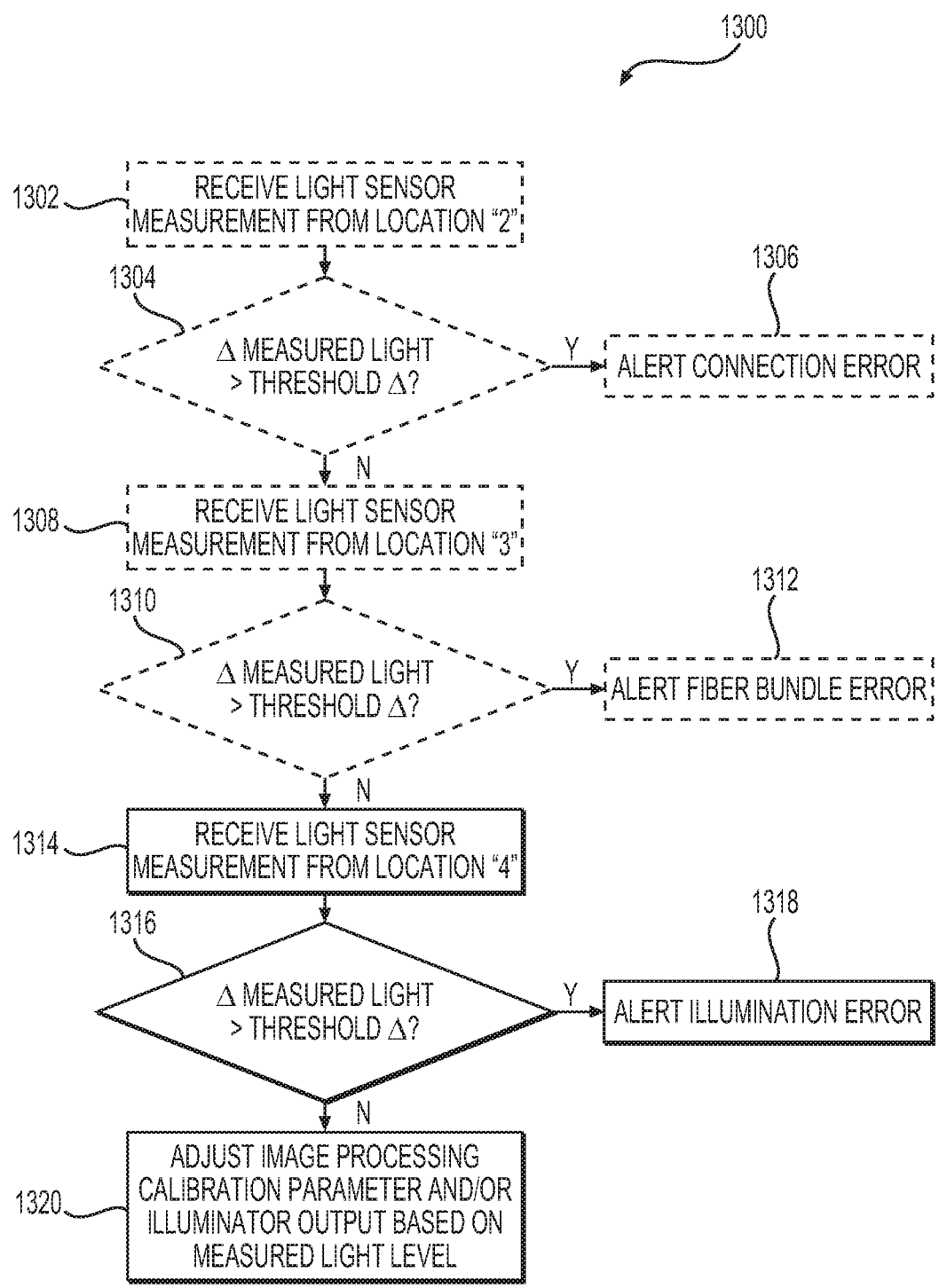
FIG. 13 is a flowchart illustrating an example process of adjusting operation of the electronics cart based on the received light sensor measurement.

FIG. 13 is a flowchart illustrating an example process 1300 of adjusting operation of the controller system 702 based on the received light sensor measurement. The process 1300 may be implemented at each sampling interval of the controller system 702. At 1302, the controller system 702 receives a measurement of the received light at the second location. At 1304, the controller system 702 determines a difference between the measurement of the light produced by the light source 704 and the measurement of the light received at the second location. The controller system 702 evaluates whether the difference exceeds a threshold level of allowable attenuation between the light produced by the light source 704 and the light received at the second location. If yes, at 1306, the controller system 702 generates an alert of a connection error indicating that an abnormal amount of attenuation has been detected at the first connector 708.

Otherwise, at 1308 the controller system 702 receives a measurement of the received light at the third location. At 1310, the controller system 702 determines a difference between the measurement of the light produced by the light source 704 and the measurement of the light received at the third location. Alternatively or additionally, the controller system 702 determines a difference between the measurement of the light received at the third location and the measurement of the light received at the third location. The controller system 702 evaluates whether the difference exceeds a threshold level of allowable attenuation between the light produced by the light source 704 and the light received at the third location. Alternatively or additionally, the controller system 702 evaluates whether the difference exceeds a threshold of allowable attenuation between the light received at the third location and the light received at the second location. If yes, at 1312, the controller system 702 generates an alert of a light guide error indicating that an abnormal amount of attenuation has been detected along the light guide 712.

Otherwise, at 1314 the controller system 702 receives a measurement of the received light at the fourth location. At 1316, the controller system 702 determines a difference between the measurement of the light produced by the light source 704 and the measurement of the light received at the fourth location. Alternatively or additionally, the controller system 702 determines a difference between the measurement of the light received at the fourth location and the measurement of the light received at the second and/or third location. The controller system 702 evaluates whether the difference exceeds a threshold level of allowable attenuation between the light produced by the light source 704 and the light received at the fourth location. Alternatively or additionally, the controller system 702 evaluates whether the difference exceeds a threshold of allowable attenuation between the light received at the fourth location and the light received at the second and/or third location. If yes, at 1318, the controller system 702 generates an alert of a total attenuation error indicating that an abnormal amount of attenuation has been detected along the system 700.

Otherwise, at 1320 the controller system 702 adjusts operation to compensate for the attenuation of the light produced by the light source 704 by the system 700. For example, the controller system 702 may adjust the output of the light source 704 to increase the output to compensate for the measured attenuation. Alternatively or additionally, the controller system 702 may adjust one or more calibration parameters for processing images received from the camera 718 to compensate for the measured attenuation. For example, one or more calibration parameters may be adjusted for parameters associated with brightness, luminance, or contrast when the controller system 702 processes images received from the camera 718.

Depending on whether light sensors are positioned at each of the second, third, or fourth locations, one or more of 1302-1318 may optionally be omitted or performed in a different order.

It should be appreciated that the logical operations described herein with respect to the various figures may be implemented (1) as a sequence of computer implemented acts or program modules (i.e., software) running on a computing device (e.g., the computing device described in FIG. 14), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 14:
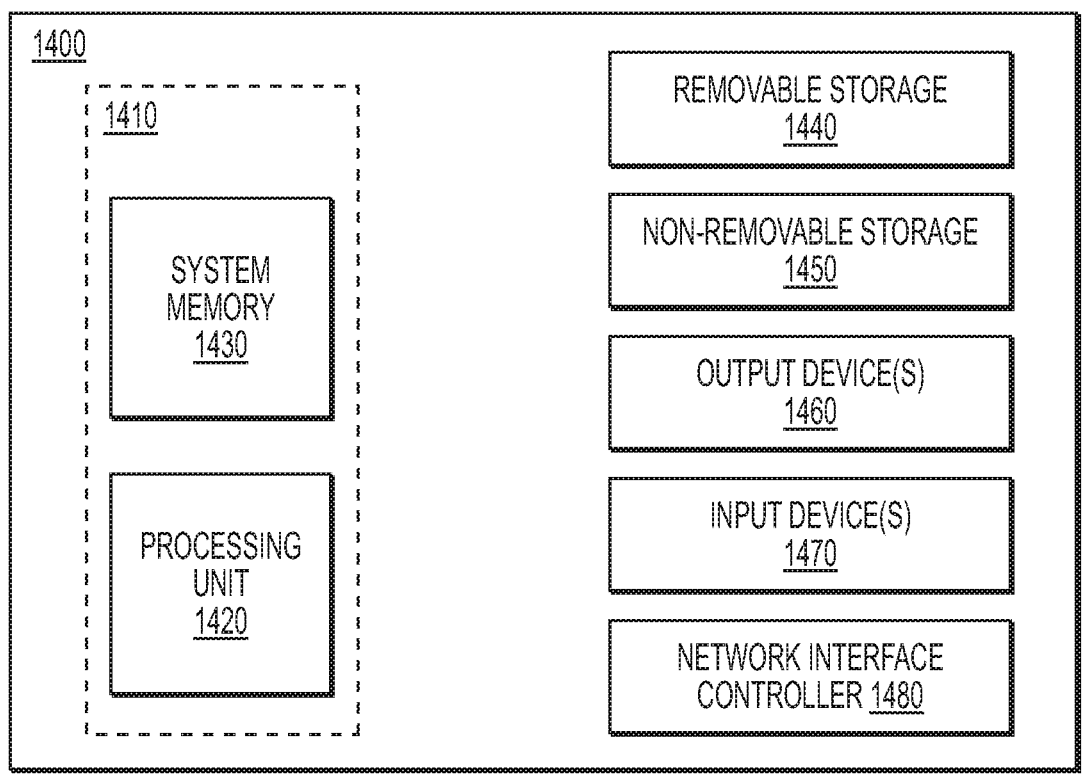
FIG. 14 illustrates an exemplary computer system.

Referring to FIG. 14, an example computing device 1400 upon which embodiments of the invention may be implemented is illustrated. For example, each of the computer processor located on an electronics cart 56 or electronics cart 24, computer processor 58, or controller system 702 described herein may each be implemented as a computing device, such as computing device 1400. It should be understood that the example computing device 1400 is only one example of a suitable computing environment upon which embodiments of the invention may be implemented. Optionally, the computing device 1400 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 1400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 1400 to provide the functionality of a number of servers that is not directly bound to the number of computers in the computing device 1400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In its most basic configuration, computing device 1400 typically includes at least one processing unit 1420 and system memory 1430. Depending on the exact configuration and type of computing device, system memory 1430 may be volatile (such as random-access memory (RAM)), non-volatile (such as read-only memory (ROM), flash memory, etc.), or some combination of the two. This most basic configuration is illustrated in FIG. 14 by dashed line 1410. The processing unit 1420 may be a standard programmable processor that performs arithmetic and logic operations necessary for operation of the computing device 1400. For example, the processing unit may be programmed to execute the process 1300 described above. While only one processing unit 1420 is shown, multiple processors may be present. Thus, while instructions may be discussed as executed by a processor, the instructions may be executed simultaneously, serially, or otherwise executed by one or multiple processors. The computing device 1400 may also include a bus or other communication mechanism for communicating information among various components of the computing device 1400.

Computing device 1400 may have additional features/functionality. For example, computing device 1400 may include additional storage such as removable storage 1440 and non-removable storage 1450 including, but not limited to, magnetic or optical disks or tapes. Computing device 1400 may also contain network connection(s) 1480 that allow the device to communicate with other devices such as over the communication pathways described herein. The network connection(s) 1480 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1400 may also have input device(s) 1470 such as a keyboards, keypads, switches, dials, mice, track balls, touch screens, voice recognizers, card readers, paper tape readers, or other well-known input devices. Output device(s) 1460 such as a printers, video monitors, liquid crystal displays (LCDs), touch screen displays, displays, speakers, etc. may also be included. The additional devices may be connected to the bus in order to facilitate communication of data among the components of the computing device 1400. All these devices are well known in the art and need not be discussed at length here.

The processing unit 1420 may be configured to execute program code encoded in tangible, computer-readable media. Tangible, computer-readable media refers to any media that is capable of providing data that causes the computing device 1400 (i.e., a machine) to operate in a particular fashion. Various computer-readable media may be utilized to provide instructions to the processing unit 1420 for execution. Example tangible, computer-readable media may include, but is not limited to, volatile media, non-volatile media, removable media and non-removable media implemented in any method or technology for storage of information such as computer readable instructions, data structures, program modules or other data. System memory 1430, removable storage 1440, and non-removable storage 1450 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1420 may execute program code stored in the system memory 1430. For example, the bus may carry data to the system memory 1430, from which the processing unit 1420 receives and executes instructions. The data received by the system memory 1430 may optionally be stored on the removable storage 1440 or the non-removable storage 1450 before or after execution by the processing unit 1420.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
   a controller system comprising an illumination source and a connection port;
   an image capture device comprising a light guide with a connector configured to connect to the connection port, wherein the image capture device receives light supplied by the illumination source via the connection port and the light guide, wherein the image capture device is configured to illuminate a scene with the received light; and
   a light sensor configured to measure a power of the received light, wherein the controller system is configured to evaluate whether a difference between the power of the received light received by the image capture device and a power of the light supplied by the illumination source of the controller system exceeds a threshold level of allowable attenuation, and if not, adjust operation based on the power of the received light as measured by the light sensor.

2. The system of claim 1, wherein the power of the received light is an overall power of the received light or a power at one or more wavelengths of the received light.

3. The system of claim 1, wherein the light sensor is positioned within a housing of the image capture device, at the connector, or at a connector between the light guide and the image capture device.

4. The system of claim 1, wherein the light sensor is one of a plurality of light sensors positioned within a housing of the image capture device, at the connector, and/or at a connector between the light guide and the image capture device.

5. The system of claim 4, wherein the controller system is configured to determine a location of an illumination error based on a difference between a first measured power of the received light at a first position and a second measured power of the received light at a second position.

6. The system of claim 1, wherein the controller system is configured to adjust operation to change an output of the illumination source based on the measured power of the received light.

7. The system of claim 1, wherein the controller system is configured to adjust operation to change a calibration parameter for processing images received by the image capture device based on the measured power of the received light.

8. The system of claim 1, wherein the light sensor is clamped to the light guide to measure a portion of the received light scattered or refracted out of the light guide.

9. The system of claim 1, wherein the light guide is a fiber optic bundle, wherein a subset of optical fibers from the fiber optic bundle is bifurcated from the fiber optic bundle and directed to provide a portion of the received light to the light sensor.

10. The system of claim 1, wherein the light sensor is positioned to measure the received light scattered at a connection between the light guide and a second light guide.

11. A method of closed-loop control of an illumination source coupled to an external device, the method comprising:
    supplying light from the illumination source to a connection port;
    measuring a power of the supplied light at the illumination source;
    receiving light at a connector of the external device coupled to the connection port;
    measuring a power of the received light by a light sensor at the connector of the external device;
    communicating the measured power of the received light from the external device to the illumination source;
    evaluating whether a difference between the received light received at the connector of the external device and the supplied light exceeds a threshold level of allowable attenuation; and
    when the difference does not exceed the threshold level, adjusting an output of light supplied by the illumination source based on the measured power of the supplied light and the measured power of the received light.

12. The method of claim 11, wherein the external device is an image capture device.

13. The method of claim 12, further comprising:
    adjusting a calibration parameter for processing images received by the image capture device based on the measured power of the supplied light and the measured power and of the received light.

14. The method of claim 12, wherein the image capture device is an endoscope.

15. The method of claim 11, wherein the light sensor is clamped to a light guide of the external device.

16. The method of claim 15, wherein the light guide is a fiber optic bundle, wherein a subset of optical fibers from a fiber optic bundle is bifurcated from the fiber optic bundle and directed to provide a portion of the received light to the light sensor.

17. The method of claim 11, wherein the light sensor is positioned to measure the received light scattered at a connection between a first light guide and a second light guide in the external device.

18. The method of claim 11, further comprising:
    filtering the received light to supply one or more channels of the received light to the light sensor.

19. The method of claim 18, wherein filtering the received light comprises directing the received light through a dichroic filter.

20. The method of claim 18, wherein filtering the received light comprises directing the received light through a trichroic prism or other multi-channel spectral separation optical component or assembly.

* * * * *